US010805290B1

(12) United States Patent
Griffin et al.

(10) Patent No.: US 10,805,290 B1
(45) Date of Patent: *Oct. 13, 2020

(54) COMPLIANCE AND AUDIT USING BIOMETRIC TOKENIZATION

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 16/155,377

(22) Filed: Oct. 9, 2018

Related U.S. Application Data

(63) Continuation of application No. 15/482,008, filed on Apr. 7, 2017, now Pat. No. 10,193,884, which is a
(Continued)

(51) Int. Cl.
*H04L 29/06* (2006.01)
*H04L 9/32* (2006.01)
*G06F 21/32* (2013.01)

(52) U.S. Cl.
CPC .......... *H04L 63/0861* (2013.01); *G06F 21/32* (2013.01); *H04L 9/3231* (2013.01); *H04L 9/3247* (2013.01)

(58) Field of Classification Search
None
See application file for complete search history.

(56) References Cited

U.S. PATENT DOCUMENTS

| 7,941,668 B2 | 5/2011 | Stapleton et al. |
| 8,289,135 B2 | 10/2012 | Griffin |

(Continued)

OTHER PUBLICATIONS

American National Standard for Financial Services, "ANSI X9.119-2016, Retail Financial Services, Requirements for Protection of Sensitive Payment Card Data, Part 2: Implementing Post-Authorization Tokenization Systems", 2016. 67 pages.
(Continued)

*Primary Examiner* — Benjamin E Lanier
(74) *Attorney, Agent, or Firm* — Foley & Lardner LLP

(57) ABSTRACT

Various embodiments relate to a method of auditing a biometric enrollment event journal entry, performed by a processor of an authentication computing system. An example method includes receiving a biometric enrollment event journal entry. The entry includes a tokenized biometric reference sample and a biometric reference template identifier. The tokenized biometric reference sample is generated by tokenizing at least one biometric reference sample captured from a user having a unique user identifier. The biometric reference template identifier uniquely identifies a biometric reference template generated using the at least one biometric reference sample. The tokenized biometric reference sample and biometric reference template associated with the biometric reference template identifier in the biometric enrollment event journal entry is retrieved. It is determined whether the detokenized biometric reference sample matches the biometric reference template. An enrollment match value indicative of whether the biometric reference sample matched the biometric reference template is generated.

18 Claims, 4 Drawing Sheets

Related U.S. Application Data continuation-in-part of application No. 15/188,685, filed on Jun. 21, 2016, now Pat. No. 10,142,333.

(56) References Cited

U.S. PATENT DOCUMENTS

| | | |
|---|---|---|
| 8,301,902 B2 | 10/2012 | Griffin |
| 8,327,134 B2 | 12/2012 | Griffin |
| 8,359,475 B2 | 1/2013 | Griffin |
| 8,508,339 B2 | 8/2013 | Griffin |
| 8,700,909 B2 | 4/2014 | Griffin |
| 8,756,416 B2 | 6/2014 | Griffin |
| 8,782,397 B2 | 7/2014 | Arnold et al. |
| 10,142,333 B1 | 11/2018 | Griffin et al. |
| 2004/0010697 A1 | 1/2004 | White |
| 2005/0229007 A1 | 10/2005 | Bolle et al. |
| 2006/0239511 A1 | 10/2006 | White et al. |
| 2007/0283165 A1 | 12/2007 | Milgramm et al. |
| 2009/0164796 A1 | 6/2009 | Peirce |
| 2010/0205431 A1 | 8/2010 | Griffin |
| 2011/0138187 A1 | 6/2011 | Kaga et al. |
| 2012/0167183 A1 | 6/2012 | Langley |
| 2014/0149747 A1 | 5/2014 | Bowers |
| 2016/0203496 A1 | 7/2016 | Guerrero et al. |
| 2016/0300234 A1 | 10/2016 | Moss-Pultz et al. |
| 2016/0323273 A1 | 11/2016 | Aufderheide, Jr. et al. |
| 2016/0330027 A1 | 11/2016 | Ebrahimi |

OTHER PUBLICATIONS

American National Standard for Financial Services, "Biometric Information Management and Security for Financial Services Industry", ANSI X9.84-2010, Mar. 31, 2010. 172 pages.

American National Standard for Financial Services, "Cryptographic Message Syntax ASN.1 and XML", ANSI X9.73-2010, Apr. 15, 2010. 89 pages.

Griffin, Phillip H., "Telebiometric Authentication Objects", Complex Adaptive Systems, Publication 4, Procedia Computer Science, 36, pp. 393-400, 2014. 8 pages.

International Telecommunication Union, "Series X: Data Networks, Open Security Communications and Security, OSI networking and system aspects—Naming, Addressing and Registration", X.660, Jul. 2011. 32 pages.

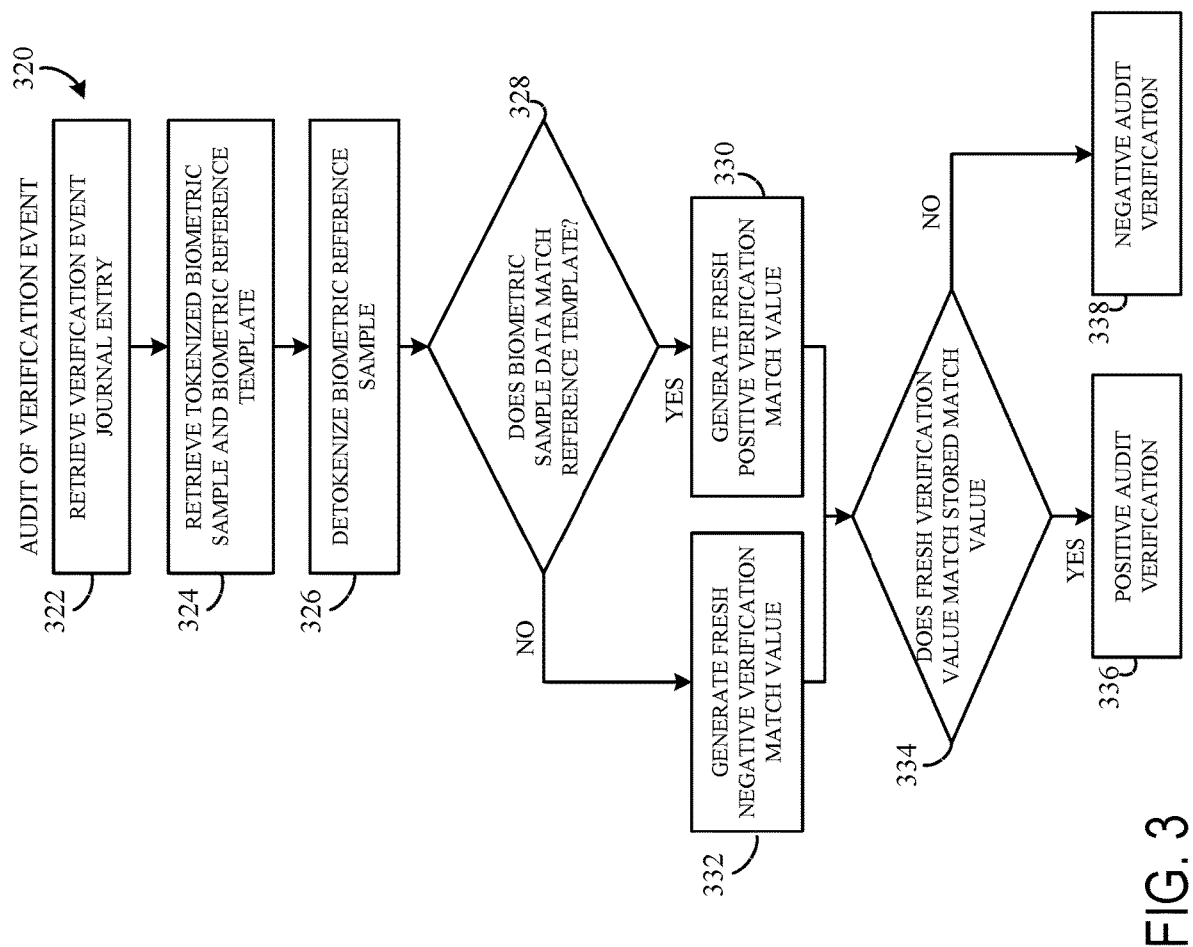
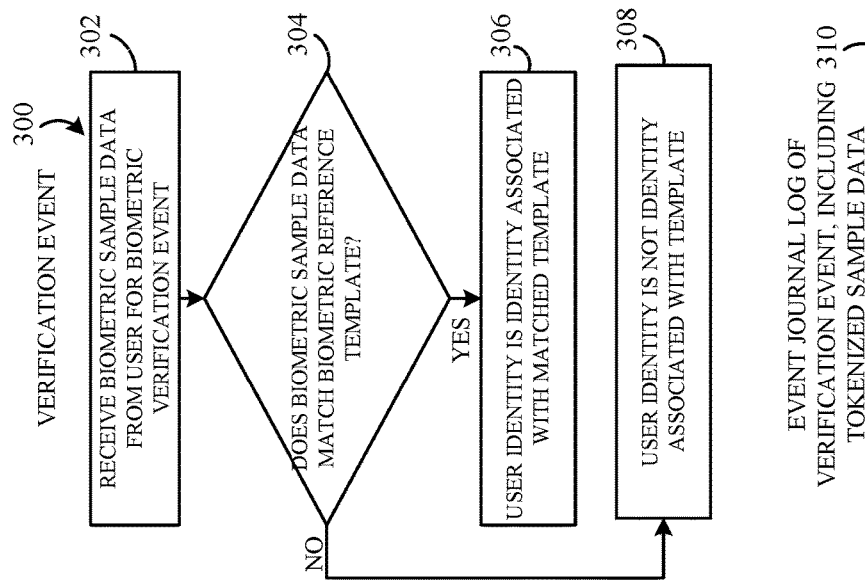
FIG. 3

COMPLIANCE AND AUDIT USING BIOMETRIC TOKENIZATION

CROSS-REFERENCE TO RELATED APPLICATIONS

This application is a continuation of U.S. patent application Ser. No. 15/482,008, filed Apr. 7, 2017, which was a continuation-in-part of U.S. patent application Ser. No. 15/188,685, filed Jun. 21, 2016, both are hereby incorporated by reference in its entirety.

BACKGROUND

Biometric technology is used to confirm the identity of an individual to provide secure access to electronic systems (e.g., to perform financial transactions). After an individual enrolls in a biometric service (e.g., provides biometric data and a non-biometric means of confirming an identity), the individual can be authenticated via the biometric service. Biometric authentication (i.e., identification and validation) leverages the universally recognized fact that certain physiological or behavioral characteristics can reliably distinguish one person from another. Biometric technology includes both automatically collecting and comparing these characteristics. Digital representations of these characteristics are stored in an electronic medium and later used to authenticate the identity of an individual. Depending on the biometric service's biometric policies and federal or state laws, there may be unnecessary exposure of the biometric data of the user or deficiencies in the system. For example, unnecessary exposure can occur through unsecure storage of the original biometric information, transfer compromise during an authentication event, and the use of complex and cumbersome cryptographic algorithms and keys for encrypting the biometric information. Additionally, destruction of original biometric information (e.g., to eliminate unnecessary exposure or future compromise) eliminates the capability to validate compliance of enrollment procedures and authentication events at a future time.

SUMMARY

Various embodiments relate to a method of auditing a biometric enrollment event journal entry, performed by a processor of an authentication computing system. An example method includes receiving a biometric enrollment event journal entry. The biometric enrollment event journal entry includes at least one tokenized biometric reference sample and a biometric reference template identifier. The least one tokenized biometric reference sample is generated by tokenizing at least one biometric reference sample captured from a user having a unique user identifier. The biometric reference template identifier uniquely identifies biometric reference template generated using the at least one biometric reference sample. The at least one tokenized biometric reference sample in the biometric enrollment event journal entry is retrieved. The biometric reference template associated with the biometric reference template identifier in the biometric enrollment event journal entry is retrieved. The at least one tokenized biometric reference sample is detokenized. It is determined whether the at least one biometric reference sample matches the biometric reference template. An enrollment match value indicative of whether the at least one biometric reference sample matched the biometric reference template is generated.

Various other embodiments relate to a method of auditing a biometric verification event journal entry, performed by a processor of an authentication computing system. An example method includes receiving a biometric verification event journal entry. The biometric verification event journal entry includes a biometric reference template identifier, at least one tokenized biometric sample, and a verification match value. The biometric reference template identifier uniquely identifies a biometric reference template generated using an at least one biometric reference sample captured from a user having a unique user identifier. The at least one tokenized biometric sample is generated by tokenizing at least one biometric sample captured from an unknown user after the generation of the biometric reference template. The verification match value is indicative of whether the at least one biometric sample matched with the biometric reference template, wherein a positive verification match value confirms the unknown user is the user having the unique identifier. The at least one tokenized biometric sample in the biometric verification event journal entry is retrieved. The biometric reference template associated with the biometric reference template identifier in the biometric verification event journal entry is retrieved. The at least one tokenized biometric sample is detokenized. It is determined whether the at least one biometric reference sample matches the biometric reference template. A fresh verification match value indicative of whether the at least one biometric sample matched the biometric reference template is generated. It is determined whether the fresh verification match value matches the verification match value. An audit verification match value indicative of whether the fresh verification match value matches the verification match value is generated.

Various other embodiments relate to a method of auditing a biometric identification event journal entry, performed by a processor of an authentication computing system. An example method includes receiving a biometric identification event journal entry. The biometric identification event journal entry includes at least one tokenized biometric sample and an identification match value. The at least one tokenized biometric sample was generated by tokenizing at least one biometric sample captured from an unknown user. The identification match value is indicative of whether the at least one biometric sample matched a biometric reference template within a plurality of biometric reference templates. A positive identification match value includes a biometric reference template identifier. The biometric reference template identifier uniquely identifies the biometric reference template generated using an at least one biometric reference sample captured from a user having a unique user identifier, wherein the positive identification match value confirms the unknown user is the user having the unique user identifier. The at least one tokenized biometric sample in the biometric identification event journal entry is retrieved. The biometric reference template associated with the biometric reference template identifier in the biometric identification event journal entry is retrieved. The at least one tokenized biometric sample is detokenized. It is determined whether the at least one biometric reference sample matches the biometric reference template. A fresh identification match value indicative of whether the at least one biometric sample matched the biometric reference template is generated. It is determined whether the fresh identification match value matches the identification match value. An audit identification match value indicative of whether the fresh identification match value matches the identification match value is generated.

Various other embodiments relate to a method of auditing a biometric identification event journal entry, performed by a processor of an authentication computing system. An example method includes receiving a biometric identification event journal entry. The biometric identification event journal entry includes at least one tokenized biometric sample and an identification match value. The at least one tokenized biometric sample was generated by tokenizing at least one biometric sample captured from an unknown user. The identification match value is indicative of whether the at least one biometric sample matched a biometric reference template within a plurality of biometric reference templates. A negative identification match value includes a plurality of biometric reference template identifiers. The plurality of biometric reference template identifiers uniquely identifies the plurality of biometric reference templates used to determine whether the at least one biometric sample matched with a biometric reference template, and the negative identification match value confirms the unknown user is not within the plurality of users. The biometric reference template identifier uniquely identifies the biometric reference template generated using an at least one biometric reference sample captured from a user having a unique user identifier, wherein the positive identification match value confirms the unknown user is a user. The at least one tokenized biometric sample in the biometric identification event journal entry is retrieved. The biometric reference template associated with the biometric reference template identifier in the biometric identification event journal entry is retrieved. The at least one tokenized biometric sample is detokenized. It is determined whether the at least one biometric reference sample matches the biometric reference template. A fresh identification match value indicative of whether the at least one biometric sample matched the biometric reference template is generated. It is determined whether the fresh identification match value matches the identification match value. An audit identification match value indicative of whether the fresh identification match value matches the identification match value is generated.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 3 is a flow diagram of a method of auditing a biometric verification event journal entry, according to an example embodiment.

DETAILED DESCRIPTION

Figure 1:
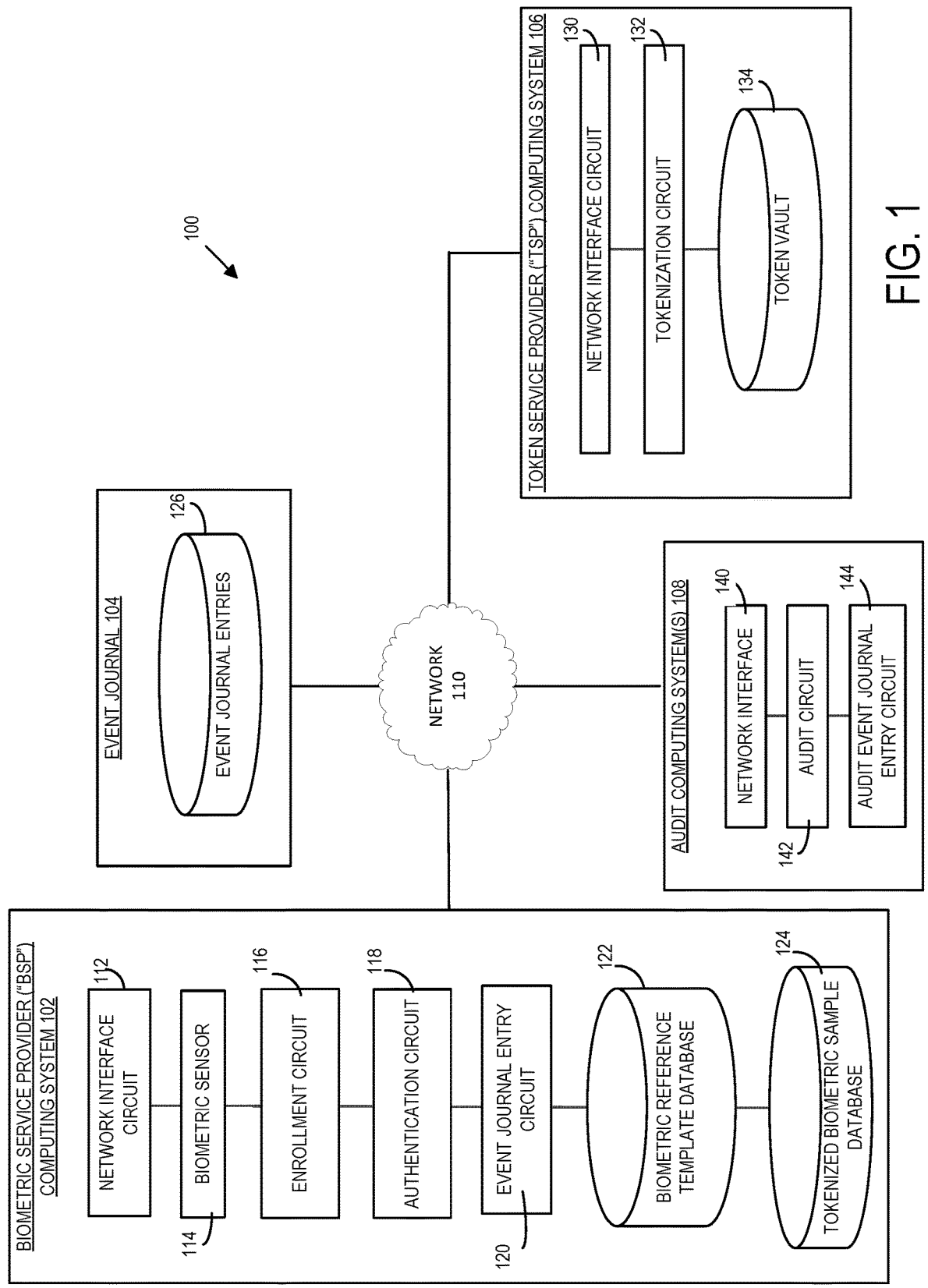
FIG. 1 is a schematic diagram of a biometric authentication audit system, according to an example embodiment.

Biometrics can be used for human identification and authentication for physical and logical access. Logical access can include access to applications, services, or entitlements. Authentication systems require that the party who wishes to be authenticated has enrolled a biometric reference template at a biometric service provider ("BSP") or similar entity. A biometric reference template is a digital reference of distinct characteristics of an individual obtained by processing one or more biometric samples from the individual. Subsequent to enrollment, biometric reference templates are used during biometric authentication processes. Biometric authentication processes include verification or identification. Verification is the process of comparing a match template against a specific reference template based on a claimed identity (e.g., user ID, account number, etc.). Verification is a "one-to-one" comparison that entails comparing a match template generated from a newly captured sample with a previously generated reference template stored in a database or on an ID card. Identification is the process of comparing a submitted biometric sample against multiple enrolled reference templates to determine an individual's identity. Identification is a "one-to-many" comparison that entails the comparison of a match template generated from a newly captured sample with multiple templates in the database. Identification is most often used to determine whether or not a person has previously enrolled in the system. Identification is also used by law enforcement to identify unknown suspects.

Current security techniques for protecting biometric data confidentiality in biometric reference templates have considered encryption for securely transferring biometric samples or storing biometric templates. Protection by encryption may be performed by a BSP that manages a store of biometric reference templates. Issues arise when an attacker, including an insider attacker, gains access to the BSP's store of biometric reference templates, as well as the individual users' biometric data. Currently, to protect the confidentiality of personally identifiable biometric data, symmetric key encryption can be used (e.g., as set forth in ISO 19092 and X9.84 biometric information security and management standards for financial services).

Compliance checks and audits may be performed to validate the adequacy of the protection and confidentiality of the personally identifiable biometric data. These checks may be periodic (e.g., in accordance with regulations) or to resolve a specific dispute (e.g., in accordance with a litigation or arising out of a disagreement). Current methods require the use of encryption that makes use of cumbersome overhead of key management system architecture and corresponding processing requirements to meet and maintain key management requirements. In addition, once biometric data has been processed (e.g., to generate a reference template), it is not possible to reconstruct the raw biometric data from the processed sample or template. Therefore, when BSPs discard or destroy the biometric data used in enrollment, there is no way to audit the information used to generate the biometric reference templates.

Referring generally to the figures, systems and methods for auditing and maintaining compliance records for biometric information are described herein. Embodiments relate generally to the methods and processes for a biometric authentication audit system. Generally, the biometric authentication audit system facilitates the tokenization of the at least one biometric reference sample used during enrollment, verification, or identification and logs them in an event journal as part of a normal biometric event (e.g., successful enrollment, successful authentication, failed authentication). The tokenization includes obfuscating the plaintext and generating tokenized data (e.g., generating a token). Subsequently, the at least one tokenized biometric reference sample is detokenized and verified (e.g., matched, etc.) against the associated biometric reference template for a plurality of reasons, such as an event journal audit (e.g., as part of a security assessment, compliance evaluation, or penetration test), dispute resolution, fraud investigation, and the like. Tokenization is a form of obfuscating the cleartext such that it is replaced with a pseudonym data element in the form of a token. Generally, the tokenization and detokenization of data is processed by a tokenization service provider ("TSP").

The biometric authentication audit system protects biometric data during transfer and while at rest, generates biometric event journal entries, and allows for the subsequent audit and compliance checks of the various activities (e.g., enrollment, verification, identification, etc.) in the event journal. During enrollment, a BSP captures one or more biometric samples (e.g., fingerprint, voiceprint, iris image, hand geometry, keystroke patterns, dynamic signatures) using a biometric sensor. The biometric data is processed to create a biometric reference template for subsequent biometric authentication. Each biometric reference sample is tokenized, and the at least one tokenized biometric reference sample is logged as part of a biometric enrollment event entry in the event journal. In some arrangements, the biometric reference template is also tokenized, and the tokenized biometric reference template is stored for subsequent biometric authentication. When performing biometric verification, the user provides a claimed identity which is used to locate the user profile that contains the tokenized biometric reference template. The tokenized biometric reference template is detokenized and matched with at least one biometric sample previously captured using a biometric sensor. The at least one biometric sample is tokenized, and verification match value is logged as part of the success or failure of the biometric verification event in an entry on the event journal. When performing biometric identification, the user does not provide an identity but rather at least one biometric sample is captured using a biometric sensor and used to match against a plurality of stored templates to determine the user profile and identity. Each biometric reference template is retrieved and matched with the least one biometric sample to generate a positive (e.g., match) or negative (e.g., no match) identification match value. The at least one biometric sample is tokenized and the biometric identification match value is logged as part of the success or failure of the biometric identification event in an entry on the event journal.

The event journal can be reviewed at any time to determine if the biometric event logs are complete, accurate, and without error. The event journal does not contain any biometric data, only biometric tokens that can be detokenized and re-verified using the biometric reference template indicated by a biometric reference template identifier in the event journal entry. In some arrangements, the tokenized biometric reference template is included in the event logs in lieu of the biometric reference template identifier. To audit a biometric enrollment event, the logged tokenized biometric samples are detokenized, the associated tokenized biometric reference template is detokenized, and the biometric enrollment samples are verified (e.g., matched) against the biometric reference template. To audit a biometric authentication event, the logged biometric verification entry or biometric identification entry is retrieved, the associated at least one tokenized biometric sample is detokenized, the associated biometric reference template is retrieved, and the at least one biometric sample used in the authentication is matched against the biometric reference template. Successful logged authentication events should re-succeed, and failed logged authentication events should re-fail.

The event journal can also be reviewed as part of a dispute resolution or fraud investigation. For example, if a user disputed an action, the event journal can provide evidence as to whether biometric authentication was successfully used. The relevant biometric events in the event journal can be used to access and detokenize the logged biometric enrollment tokens, biometric verification tokens, or biometric identification tokens to verify the biometric authentication events and/or to identify a fraudster. As will be appreciated, the TSP is the only source capable of detokenizing the biometric tokens to recover the biometric enrollment samples, biometric reference template, or any biometric authentication samples. Further, only the BSP performs the biometric enrollment, biometric verification, and biometric identification. Alternatively, the BSP might be fully contained within the TSP such that no biometric data is ever stored outside the controlled environment of the TSP.

These embodiments abrogate the issues with the current biometric security and storage ecosystems, as the use of the specific tokenization techniques and schema protect biometric data during transfer and while at rest allow for the subsequent audit and compliance checks of the various activities (e.g., enrollment, verification, identification, etc.) with the biometric information. The biometric authentication audit system, according to various embodiments, provides a more effective and efficient way to securely transport and store biometric data for a subsequent audit of the biometric data and or authentication events. The secure transport and protection of the biometric data is in accordance with industry standards and allows the user of the biometric authentication audit system to restrict access to sensitive biometric data to those with a need-to-know. Tokenization and use of identifiers of the sensitive data in the event log entries allows the event log entries to be stored, transferred, distributed, or used securely, without loss of confidentiality. To that end, the biometric authentication audit system alleviates the issue of having sensitive biometric data stored as cleartext within event log entries that might be transmitted across international borders or via an unsecure network. Additionally, the biometric authentication audit system alleviates the practice of not storing (e.g., eliminating or destroying) the biometric reference samples or biometric samples for authentication after the initial use for fear of compromise or unauthorized access. The biometric authentication audit system allows for validating compliance or auditing biometric authentication events while maintaining the security posture of the system to ensure that the biometric data is safe from man-in-the-middle attacks and data breaches.

Further, the methods and systems described herein alleviate the strain on processing power and memory components currently required to manage, store, and authenticate secure biometric data. Embodiments described herein utilize a less strenuous processing method through a specific tokenization system and do not have the overhead of meeting and maintaining key management requirements as required in current authentication systems. Under current systems that utilize encryption, processing power is dedicated to managing keys that are dedicated only to encrypting the biometric data. Through the use of tokenization, this key management issue is alleviated through the use of a TSP (either in-house or external) as the tokenization techniques require no key management. Additionally, processing power is alleviated by the use of a globally-unique information object identifier ("OID") and signed attributes to identify the processing algorithm used for the biometric data. For example, in some embodiments, a biometric reference template may process two biometric data types using two different algorithms that are easily discernable through the OIDs. Therefore, the biometric authentication audit system reduces the processing power and memory storage requirements necessary to provide secure access to biometric data for authentication of individual requesting entities.

In addition, methods and systems described herein improve biometric processing systems by enabling biometric processing techniques to be audited and verified at a later time. Typically, once biometric data has been processed (e.g., a biometric reference template has been generated), it is not possible to reconstruct the raw biometric data from the processed sample or template. Various embodiments include tokenizing the raw biometric data and storing the tokenized biometric data so that the data may be securely accessed and audited in accordance with regulations, standards, or best practices of a BSP.

FIG. 1 is a schematic diagram of a biometric authentication audit system 100, according to an example embodiment. The biometric authentication audit system 100 includes a BSP computing system 102, an event journal 104, a TSP computing system 106, and one or more audit computing systems 108. Each of the BSP computing system 102, the event journal 104, the TSP computing system 106, and the audit computing systems 108 is in operative communication with the others via a network 110. The network 110 may include, for example, the Internet, cellular networks, proprietary banking networks, and the like.

Generally, the biometric authentication audit system 100 is used to generate event journal entries 126 in response to an enrollment or authentication event, securely store biometric information, and facilitate the subsequent audit of the event journal entries 126 in the event journal 104. Although various embodiments are described in connection with users of financial systems, it should be understood that the systems and methods described herein may similarly be used to provide biometric authentication in any type of system, such as enterprise security and other types of systems. While the TSP computing system 106 and the BSP computing system 102 are shown as separate entities in FIG. 1, in some embodiments the BSP computing system 102 performs some of or all of the functions of the TSP computing system 106, as described herein. In some embodiments, one or both of the BSP computing system 102 and the TSP computing system 106 are managed and operated by a financial institution. However, in other embodiments, one or both of the BSP computing system 102 and the TSP computing system 106 are managed and operated by a third-party that is external to a financial institution.

The BSP computing system 102 includes a network interface circuit 112, a biometric sensor 114, an enrollment circuit 116, an authentication circuit 118, an event journal entry circuit 120, a biometric reference template database 122, and a tokenized biometric sample database 124. The BSP computing system 102 may include, for example, one or more servers each with one or more processors configured to execute instructions stored in a memory, send and receive data stored in the memory, and perform other operations to implement the services described herein. The network interface circuit 112 is structured to facilitate operative communication between the BSP computing system 102 and other systems and devices over the network 110.

The biometric sensor 114 is structured to capture a biometric sample from an individual and to process the biometric sample to generate the biometric data. The biometric sample can be for an enrollment or a subsequent authentication event. The biometric data may be referred to as "raw" biometric data. For example, the sensor can be structured to read a fingerprint, voice print, or other biometric marker. Generally, the biometric sensor is any device that supports the capture of biometric data. In some embodiments, the capturing of the biometric sample (either for enrollment or authentication) is initiated by an employee of the BSP entering data into a computing system (e.g., an employee terminal connected to the server of the BSP) during a person-to-person interaction. For example, the user (e.g., the customer) may walk into a branch location of the BSP and initiate an enrollment request or a biometric authentication event.

In some arrangements, the biometric sensor 114 is external to the BSP computing system 102. For example, the biometric sensor 114 is a fingerprint sensor or camera in a user's smartphone. In such arrangements, the biometric sample is transmitted from the biometric sensor 114 to the BSP computing system 102. In those arrangements, the received biometric sample may also include a plurality of source identifiers. The plurality of source identifiers can include a device identifier uniquely identifying a device used to capture the at least one biometric sample, a location at which the biometric sample was captured, a device MAC address, or the like. Additionally, the source identifiers can be validated during the audit process.

The enrollment circuit 116 is structured to generate a user's biometric reference template, which is identified by a unique user identifier. Generally, the enrollment circuit 116 controls enrollment, the process through which the user's identity is bound with biometric data and entered into the system database as a biometric reference template. To generate a biometric reference template, the enrollment circuit 116 first receives the at least one biometric reference sample and a user identifier. The enrollment circuit 116 processes the biometric reference sample to generate the biometric reference template. In arrangements where the biometric reference template is to be tokenized, the enrollment circuit 116 transmits the biometric data to the TSP computing system 106 to be tokenized and receives from the TSP computing system 106 a tokenized biometric reference template. In those arrangements, the biometric reference template may include a template identifier uniquely identifying the biometric reference template, the tokenized biometric data, and a first identifier signifying that the biometric reference template includes tokenized biometric data. The template identifier is associated with the user identifier and used for locating the biometric reference template in the database 122. In some embodiments, the biometric reference template and/or the at least one biometric reference sample can be digitally signed. The enrollment circuit 116 also facilitates the storage of the tokenized biometric sample in the database 124. The enrollment process is expanded upon in method 200 of FIG. 2.

The authentication circuit 118 is structured to authenticate a provided at least one biometric sample by comparing it to a biometric reference template in the database. The authentication circuit 118 is structured to process authentication requests for identification and verification (verification requests may include an identifier of a user from whom the biometric sample was captured). The authentication circuit 118 is structured to receive the authentication request over the network 110 and generate the corresponding instructions to authenticate the sample. For example, the authentication circuit 118 may receive a biometric sample of a fingerprint, along with the corresponding user identifier for a verification of the user identifier with the associated biometric reference template in the database 122. The authentication circuit 118 generates the corresponding instructions to retrieve the biometric reference template on file for the user identifier. If no template exists for that user identifier, the authentication circuit 118 can provide a failed authentication value to the requesting entity, including a notification of the failed authentication or steps to initiate a user biometric system enrollment process.

Upon retrieval of the stored biometric reference template in the database 122, the authentication circuit 118 can determine how to use the biometric reference template to authenticate the biometric sample. In some arrangements, the authentication circuit 118 is able, without detokenizing the template, to determine whether the template has the same biometric type as the biometric sample. In other arrangements, the authentication circuit 118 must first detokenize the template, by submitting a detokenize request with the TSP computing system 106, before the determination can be made. If the template does not have the biometric data type similar to the sample, the authentication circuit 118 may reject authentication and can provide the requesting entity a list of the biometric data types that are stored in the template. In some embodiments, the authentication circuit 118 is structured to provide the requesting party with the biometric reference template used for matching. The provided template can be transmitted along with the authentication value to the requesting entity.

The event journal entry circuit 120 is structured to generate the event journal entries 126 in the event journal 104. The event journal entry circuit 120 is in communication with the enrollment circuit 116 and the authentication 118 to generate enrollment and authentication event journal entries, respectively. In some arrangements, the event journal entry circuit 120 also facilitates the generation of the audit event journal entries of enrollment and authentication event journal entries. The event journal entries are associated with a biometric reference template and may relate to events regarding generation, authentication, and the like. Mechanisms are in place to ensure the detection of a deletion, addition, modification, or similar action to an event entry. The event journal is attributable to authenticated sources and may be digitally signed (or protected by some other means) to meet these requirements. The event journal entries can include, for example: enrollment, enrollment failure, verification, verification failure, identification, identification, termination, addition, deletion, modification, injection, summary, and archive. In some arrangements, the information in the event journal entry, the event journal entry can be signed, time stamped, and stored in an accessible repository, for example a blockchain, without concern of compromising the sensitive information. The date and time in each event journal record definition would indicate when the record was created by the BSP computing system 102. This process is expanded further in methods 210 and 220 of FIG. 2, methods 310 and 320 of FIG. 3, and methods 410 and 420 of FIG. 4.

The biometric reference template database 122 is structured to store the biometric reference template and corresponding user identifiers for all of the users that have enrolled in the biometric authentication service with the BSP. The biometric reference template database 122 can update or replace an existing biometric reference template with a new biometric reference template when the user provides an additional biometric sample. The biometric reference template database 122 provides the specific biometric reference template in response to a verification request for a user identifier, which may be analyzed to determine whether a specific biometric sample matches the specific biometric reference template.

The tokenized biometric sample database 124 is structured to store the tokenized biometric samples used for enrollment and authentication events. The tokenized biometric sample database 124 provides the specific tokenized biometric sample in response to an audit of an enrollment or an authentication event journal entry.

In some arrangements, the BSP computing system 102 includes a raw biometric sample database structured to store, off of the network 110, the raw, detokenized biometric data for all the users stored in the BSP computing system 102. The raw biometric data is stored so that it can be reprocessed using a new processing method, if the need arises. For example, a first algorithm is used to tokenize and process all the raw biometric data. However, a second algorithm may be developed and preferred over the first method. The raw biometric data in the raw biometric sample database can be processed using the new second processing algorithm and replace the corresponding biometric reference templates in the database with the new tokenized templates. For security purposes, the raw biometric sample database can be stored off of networks and only accessed to add new raw biometric data to the database or to reprocess the raw data using a new algorithm, thereby preventing access through an outside attack.

The event journal 104 includes the event journal entries 126 generated by the event journal entry circuit 120 of the BSP computing system 102, or other authorized publishing user, like the audit computing system 108. In some arrangements, the event journal 104 is stored in a blockchain that allows auditing from authorized entities while being restricted through use of a private blockchain or using cryptography in a shared blockchain.

The TSP computing system 106 includes a network interface circuit 130, a tokenization circuit 132, and a token vault 134. As will be appreciated, the term token refers generally to the tokenized data. The TSP computing system 106 may, for example, include one or more servers each with one or more processors configured to execute instructions stored in a memory, send and receive data stored in the memory, and perform other operations to implement the services described herein associated with the processing modules, databases, and processes. In some embodiments, some or all of the functions of the TSP computing system 106 are managed by the BSP computing system 102.

The network interface circuit 130 is structured to facilitate operative communication between the TSP computing system 106 and other systems and devices over the network 110.

The tokenization circuit 132 is structured to organize and facilitate the tokenization (e.g., replacing cleartext with a token) of any biometric sample data received. This includes tokenizing and detokenizing the tokenized biometric samples or the biometric reference templates from the BSP computing system 102. In some arrangements, the tokenization circuit 132 may provide an OID with the tokenized biometric data returned to the BSP computing system 102 for inclusion in the biometric reference template or tokenized biometric samples. For example, the OID could represent a TSP identifier, tokenization schema, or other information to assist the TSP computing system 106 in processing a tokenization request from the BSP computing system 102. In some arrangements, the BSP computing system 102 may transmit a detokenization request with the tokenized biometric sample to the TSP computing system 106. In other arrangements, the BSP computing system 102 may transmit a detokenization request with the tokenized biometric sample to the TSP computing system 106. In some arrangements, the tokenization circuit 132 may examine an OID (e.g., either as a signed attribute or included in the template) with the tokenized biometric sample from the BSP computing system 102.

In one embodiment, the tokenization circuit 132 is structured to generate a token recovery service attribute, which can be included in a tokenized biometric sample (or the biometric reference template in some arrangements) to specify the parameters for recovering plaintext biometric data. In one embodiment, a token recovery service attribute is represented by a tokenRecoveryService information object of class ATTRIBUTE and is defined as:

```
tokenRecoveryService ATTRIBUTE ::= {
    WITH SYNTAX        URI
    ID                 id-tokenRecoveryService
}
```

In an embodiment, the token recovery service attribute includes a URI query string that can be used to recover the plaintext data from tokenized data using the TSP computing system 106. The URI may be in the form of a URL that both identifies and locates the TSP resource capable of recovering plaintext from a given token. The attribute may support both Hypertext Transfer Protocol ("HTTP") and HTTP over Secure Sockets Layer ("HTTPS"). Additionally, a value can be used to uniquely determine the location of any tokenized value controlled by the TSP.

In an embodiment, the general syntax of the query string is:
?$token_1$=$value_1$&$account_2$=$userID_2$&$authenticator_3$= $password_3$ . . .

The information in this attribute uses the value of the token component of a biometric reference template (or in some embodiments the reference template), and an ac count value registered by the TSP that uniquely identifies the user requesting detokenization of the token value, and the authenticator password or other secret shared by the user and the TSP that is needed to authenticate that user to permit access to the token vault 134 that facilitates he detokenization of the at least one tokenized biometric reference sample or the at least one tokenized biometric sample.

The token vault 134 is structured to store the tokenization schemas that the TSP has implemented to tokenize data to facilitate the detokenization of the tokenized data. In some arrangements, the token vault 134 includes the plaintext data associated with the generated tokens. In those arrangements, The audit computing systems 108 include a network interface 140, an audit circuit 142, and an audit event journal entry circuit 144. The network interface 140 is structured to facilitate operative communication between the audit computing systems 108 and other systems and devices over the network 110. In some arrangements, the functions of the audit circuit 142 and audit event journal entry circuit 144 can be performed by circuits within the BSP computing system 102.

The audit circuit 142 is structured to audit an event journal entry generated by the event journal entry circuit 120 of the BSP computing system 102. The compliance of any authentication system as to its consistency and accuracy requirements can be ascertained by an audit trail in an event journal. Compliance can be validated internally by the BSP organization or by an external third party (e.g., the audit computing system 108). The audit process is explained in greater detail below in method 220 of FIG. 2, method 320 of FIG. 3, and method 420 of FIG. 4.

The audit computing system 108 can validate compliance or issue a formal attestation report that can be made public through the audit event journal entry circuit 144. An audit event journal entry is generated by the audit event journal entry circuit 144 is attributable to authenticated sources and may be digitally signed (or protected by some other means) to meet origin authenticity requirements. The audit event journal entry can include an audit of, for example: enrollment, enrollment failure, verification, verification failure, identification, identification, termination, addition, deletion, modification, injection, summary, and archive. In some arrangements, the information in the event journal entry, the event journal entry can be signed, time stamped, and stored in an accessible repository, for example a blockchain, without concern of compromising the sensitive information. The date and time in each audit event journal record definition would indicate when the record was created by the audit computing system 108.

Figure 2:
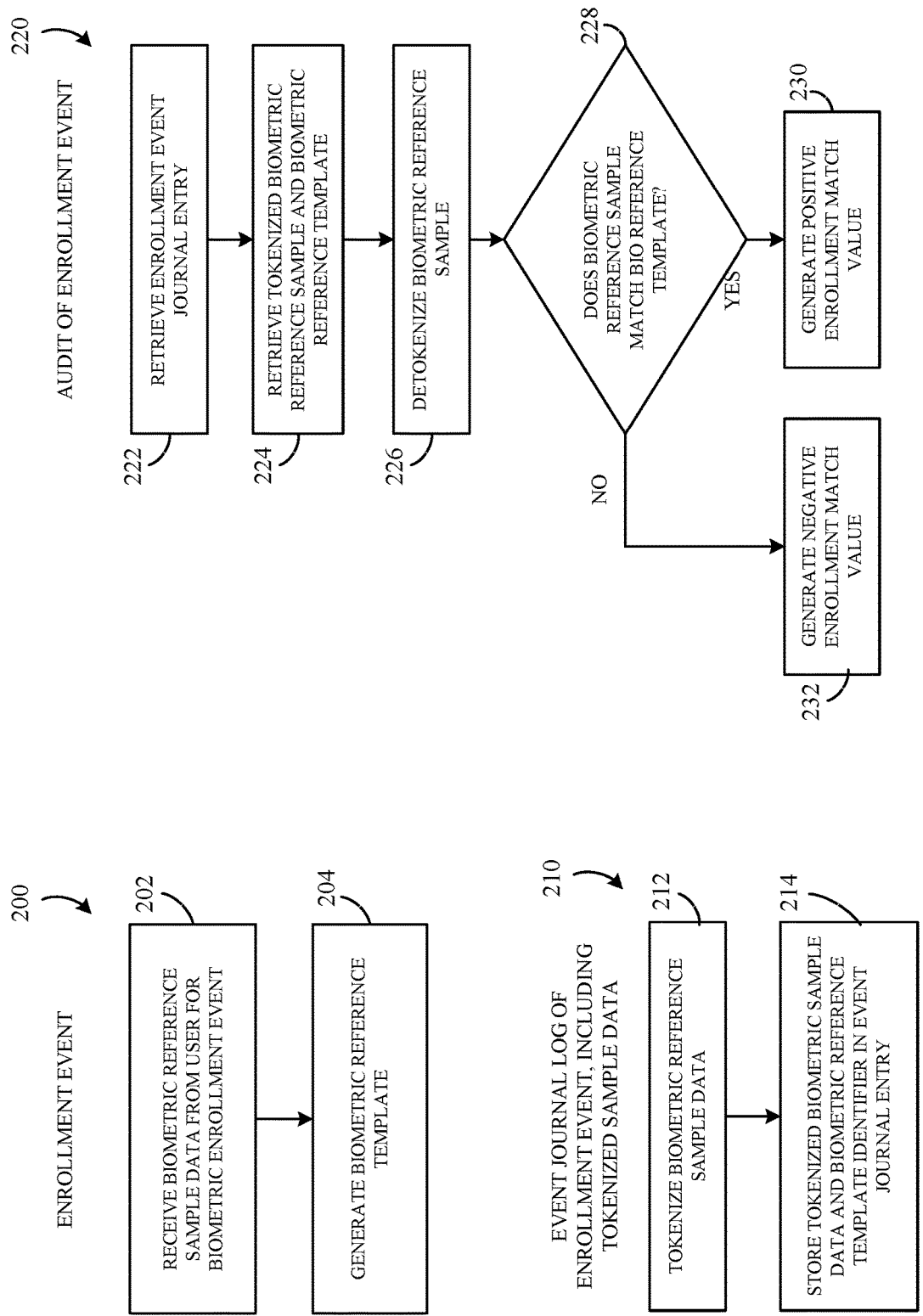
FIG. 2 is a flow diagram of a method of auditing a biometric enrollment event journal entry, according to an example embodiment.

Referring to FIG. 2, a flow diagram of a method 220 of auditing a biometric enrollment event journal entry is illustrated, according to an example embodiment. The method 220 is shown in connection with a BSP performing an internal audit, including a method 200 of enrolling a user and a method 210 of generating the enrollment event journal entry. As will be appreciated, the method 220 could be performed by an external third party, for example, an entity that manages the audit computing system 108 of FIG. 1. Additionally, the method 220 may be similarly performed by other systems and devices.

The enrollment method 200 begins with the BSP receiving at least one biometric reference sample and a user identifier at 202. The user identifier is associated with a user that is enrolling in the BSPs services. The enrollment process may include checking identification credentials (e.g., state issued driver's license, birth certificate, etc.) of the user to confirm the user's identity.

At 204, the BSP processes the provided at least one biometric reference sample to generate the biometric reference template. In some arrangements, the BSP may facilitate the tokenization of the biometric reference template.

The method 210 of generating an enrollment event journal entry begins with the BSP tokenizing the biometric reference sample data at 212. This may include transferring the data to a TSP with a tokenization request. The TSP tokenizes the biometric data and transmits the tokenized biometric data to the BSP.

At 214, the BSP generates an enrollment event entry that includes the at least one tokenized biometric reference sample and a biometric reference template identifier and stores the entry in a repository (e.g., database, blockchain, distributed ledger, etc.). In some arrangements, a tokenized biometric reference template (e.g., tokenized biometric reference template) might be included in the event entry in lieu of using the biometric reference template identifier. In some embodiments, the BSP digitally signs the tokenized biometric data and biometric reference template identifier and additional identifiers to generate the enrollment event journal entry. In some arrangements, the digital signing is performed using SignedData cryptographic message syntax to generate a SignedData message. The SignedData message allows for the binding of additional identifiers (e.g., OIDs) and other information related to the enrollment event journal entry. The information needed for detokenizing the data (e.g., token processing) can be contained in an attribute of the SignedData message that may be cryptographically bound to the enrollment event journal entry under the digital signature. Some embodiments utilize a OID as specified in the ISO/IEC 9834-1 standard. In some embodiments, the SignedData is the cryptographic message defined in the X9.73 financial industry security standard.

The method 220 of auditing the enrollment event entry begins with the auditing entity retrieving the enrollment event journal entry, at 222. In some arrangements, the retrieval includes accessing the enrollment event journal entry in a block within a blockchain. In some arrangements, the retrieval includes verifying the digital signature of the digitally signed enrollment event journal entry.

At 224, the at least one tokenized biometric reference sample and the biometric reference template (e.g., either tokenized or as an identifier) stored in the enrollment event journal entry is retrieved. In arrangements where the biometric reference template identifier is included, the identified biometric reference template is retrieved from the reference template database or repository.

At 226, the at least one tokenized biometric reference sample is detokenized. This may include transferring the data to a TSP with a detokenization request. The TSP detokenizes the biometric data and transmits the plaintext at least one biometric reference sample to the BSP. In arrangements where the biometric reference template is included the enrollment event, the stored biometric reference template is also detokenized.

At 228, it is determined whether the at least one biometric reference sample matches the biometric reference template. This process can include using the at least one biometric reference sample to generate (using the same processing techniques) a temporary biometric reference template to match to the biometric reference template. If the at least one biometric reference sample matches the biometric reference template, the audit of the enrollment process succeeds and a positive enrollment value is generated at 230. If the at least one biometric reference sample does not match the biometric reference template, the audit of the enrollment process fails and a negative enrollment value is generated at 232.

The result of the audit at 230 or 232 can trigger the generation of a compliance event journal entry to be stored in the event journal or similar repository. The compliance event journal entry includes an identifier signifying the biometric enrollment event journal entry and the enrollment match value. In some arrangements, the compliance event journal entry may be digitally signed by the entity conducting the audit event. In some arrangements, the digital signing is performed using SignedData cryptographic message syntax to generate a SignedData message and bind additional identifiers (e.g., OIDs) or information related to the compliance event journal entry to create a signed message.

Referring to FIG. 3, a flow diagram of a method 320 of auditing a biometric verification event journal entry is shown, according to an example embodiment. The method 320 is shown in connection with a BSP performing an internal audit, including a method 300 of verifying a user and a method 310 of generating the verification event journal entry. As will be appreciated, the method 320 could be performed by an external third party, for example, an entity that manages the audit computing system 108 of FIG. 1. Additionally, the method 320 may be similarly performed by other systems and devices.

The verification method 300 begins with the BSP receiving at least one biometric sample and a user identifier and/or a biometric reference template identifier at 302. The user identifier is associated with a user that has enrolled in the BSPs services. The BSP computing system locates and retrieves the biometric reference template associated with the user identifier from the BSP database.

At 304 the BSP compares the retrieved reference template to the received at least one biometric sample using a biometric processing algorithm or a biometric matching algorithm. Generally, a biometric matching algorithm measures the similarity of the sample and the detokenized biometric data in the reference template. Each comparison of a sample with the reference template results yield a score that is a numeric value indicating how closely the sample and template match. Generally, the score is related to a given confidence of positive identification for the biometric subject which can be factored into the overall rules and risk policy for the BSP's (or financial institution using the BSP) authorization policy. The method of computing the score can differ among biometric technologies, but typical methods include distance metrics, probabilistic measures, and normalized correlation. If the score is in accordance with the desired score and confidence interval, a binary decision value, regarding whether the claimant is who they claim to be, is generated.

If the matching algorithm is positive the user is authenticated, a positive match value is generated at 306. If the matching algorithm is negative the user is not authenticated, a negative match value is generated at 308.

The method 310 of generating a verification event journal entry method begins with the BSP tokenizing the at least one biometric sample data at 312. This may include transferring the at least one biometric sample to a TSP with a tokenization request. The TSP tokenizes the biometric data and transmits the at least one tokenized biometric data to the BSP.

At 314, the BSP generates a verification event entry including the at least one tokenized biometric sample, a biometric reference template identifier, and the match value (e.g., generated at 306 or 308) and stores it in a repository (e.g., database, blockchain, distributed ledger, etc.). In some arrangements, a tokenized biometric reference template (e.g., tokenized biometric reference template) might be included in the event entry in lieu of using the biometric reference template identifier. In some embodiments, the BSP digitally signs (e.g., cryptographically binds) the verification event journal entry containing the at least one tokenized biometric sample, biometric reference template identifier, and match value. In other embodiments, the BSP digitally signs the at least one tokenized biometric sample, biometric reference template identifier, match value, and additional identifiers to generate the verification event journal entry. In some arrangements, the digital signing is performed using SignedData cryptographic message syntax to generate a SignedData message and binding additional identifiers (e.g., OIDs) and other information related to the verification event journal entry to create a signed message. The information needed for detokenizing the information can be contained in an attribute of the SignedData message that may be cryptographically bound to the verification event journal entry under the digital signature.

The method 320 of auditing the verification event entry begins with the auditing entity retrieving the verification event journal entry, at 322. The verification event journal entry includes the at least one tokenized biometric sample and a biometric reference template identifier used in the original verification event and the match value (e.g., verification event result). In some arrangements, the retrieval includes accessing the verification event journal entry in a block within a blockchain. In some arrangements, the retrieval includes verifying the digital signature of the digitally signed verification event journal entry.

At 324, the at least one tokenized biometric sample and the biometric reference template (e.g., either tokenized or as an identifier) stored in the verification event journal entry is retrieved. In arrangements where the biometric reference template identifier is included, the identified biometric reference template is retrieved from the reference template database or repository.

At 326, the tokenized biometric sample is detokenized. This may include transferring the data to a TSP with a detokenization request. The TSP detokenizes the at least one tokenized biometric sample and transmits the plaintext at least one biometric sample to the BSP. In arrangements where the biometric reference template is included the verification event journal entry, the stored biometric reference template is also detokenized.

At 328, it is determined whether the at least one biometric sample matches the biometric reference template. This process can include using the biometric sample to generate (using the same processing techniques) a temporary biometric reference template to match to the biometric reference template. If the at least one biometric sample matches the biometric reference template, verification is achieved and a fresh (e.g., current for audit purposes) positive audit match value is generated at 330. If the at least one biometric sample does not match the biometric reference template, verification is not achieved and a fresh audit negative match value is generated at 332.

At 334, it is determined whether the audit match value generated at 330 or 332 is similar to the match value of the original verification event determined at 304 in the verification event method 300. If the fresh match value is similar to the match value stored in the verification event journal entry (e.g., both attempts failed or both attempts succeeded), the audit of the verification process succeeds and a positive audit verification value is generated at 336. If the fresh match value is not similar to the match value stored in the verification event journal entry (e.g., one attempt failed or and the other attempt succeeded), the audit of the verification process fails and a negative audit verification value is generated at 338.

The result of the audit at 336 or 338 can trigger the generation of a compliance event journal entry that is stored in the event journal or a similar repository. The compliance event journal entry includes an identifier signifying the biometric verification event journal entry and the verification audit match value. In some arrangements, the compliance event journal entry may be digitally signed by the entity conducting the audit event. In some arrangements, the digital signing is performed using the SignedData cryptographic message syntax to generate a SignedData message that binds additional identifiers (e.g., OIDs) and other information reacted to the compliance event journal entry.

Figure 4:
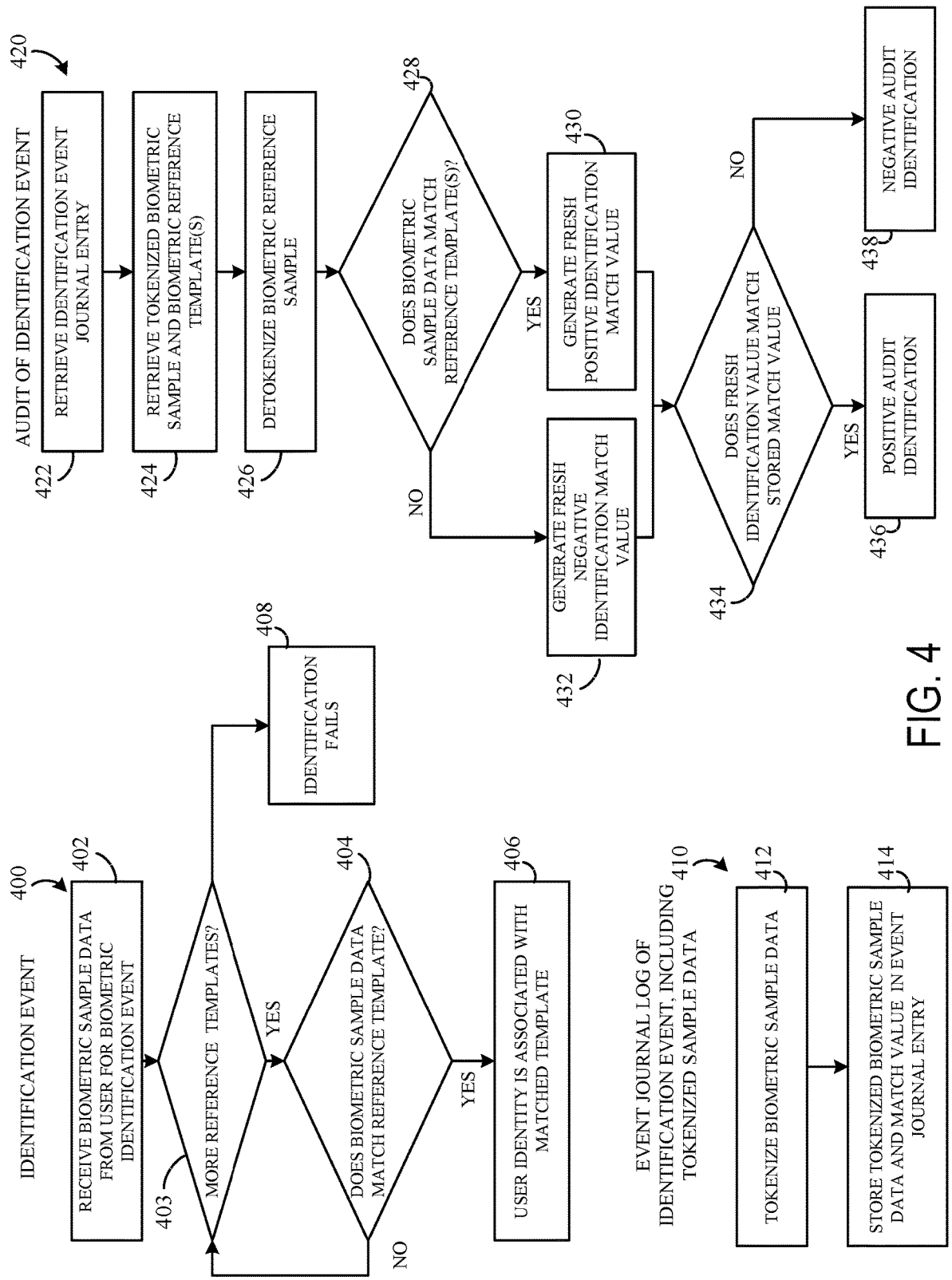
FIG. 4 is a flow diagram of a method of auditing a biometric identification event journal entry, according to an example embodiment.

Referring to FIG. 4, a flow diagram of a method 420 of auditing a biometric identification event journal entry is shown, according to an example embodiment. The method 420 is shown in connection with a BSP performing an internal audit, including a method 400 of identifying a user and a method 410 of generating the identification event journal entry. As will be appreciated, the method 420 could be performed by an external third party, for example, an entity that manages the audit computing system 108 of FIG. 1. Additionally, the method 420 may be similarly performed by other systems and devices.

The identification method 400 begins with the BSP receiving a biometric sample and a request for identification at 402. At 403, the BSP determines how many biometric reference templates must be reviewed to find a match. In some arrangements, this may include all biometric reference templates in the BSP's database. In other arrangements, it may include a subset of templates must be reviewed to find a match. In some arrangements, this may include all biometric reference templates in the BSP's database At 404, the BSP compares the determined plurality of reference templates to the received biometric sample using a biometric processing algorithm or a biometric matching algorithm. The matching algorithm measures the similarity of the sample and the detokenized biometric data in the reference template and generates a score indicative of the confidence of positive identification for the biometric sample and the biometric reference template. In an identification authentication request, the score may incorporate account additional indexing or binning information about the user sample in order to focus the computations of the matching process to biometric reference templates that are most likely to match the user sample. In the simplest case the BSP stops checking templates as soon as the first matching biometric reference template is located, returning the identity associated with that matching biometric reference template as the identity of the user, at 406. In other arrangements, the BSP may compare the user's biometric sample to all biometric reference templates in the system, in order to verify that the user does not match more than one.

If the biometric sample matches a biometric reference template, a positive match value is generated and the match biometric reference template is associated with the match value at 406. If the biometric sample does not match biometric reference template in the plurality of biometric reference templates a negative match value is generated and the plurality of biometric reference templates used may be associated with the match value at 408.

The method 410 of generating an identification event journal entry method begins with the BSP tokenizing the biometric sample data at 412. This may include transferring the data to a TSP with a tokenization request. The TSP tokenizes the biometric data and transmits the tokenized biometric data to the BSP.

At 414, the BSP generates an identification event entry including the tokenized biometric data, a biometric reference template identifier, and the match value (e.g., generated at 406 or 408) and stores it in a repository (e.g., database, blockchain, distributed ledger, etc.). In some arrangements, a tokenized biometric reference template (e.g., tokenized biometric reference template) might be included in the event entry in lieu of using the biometric reference template identifier. In some embodiments, the BSP digitally signs (e.g., cryptographically binds) the identification event journal entry containing the tokenized biometric data, biometric reference template identifier, and match value. In some arrangements, the digital signing is performed using SignedData cryptographic message syntax to generate a SignedData message and binds additional identifiers (e.g., Ms) and other information related to the identification event journal entry to create a signed message.

The method 420 of auditing the identification event entry begins with the auditing entity retrieving the identification event journal entry, at 422. The identification event journal entry includes a tokenized biometric sample, a biometric reference template identifier used in the original identification event, and the match value (e.g., identification event result). In some arrangements, the retrieval includes accessing the identification event journal entry in a block within a blockchain. In some arrangements, the retrieval includes verifying the digital signature of the digitally signed identification event journal entry.

At 424, the tokenized biometric sample and either the biometric reference template (e.g., if a positive identification event occurred at 406 in method 400) or the plurality of biometric reference templates (e.g., if a negative identification event occurred at 408 in method 400) stored in the identification event journal entry is retrieved. In arrangements where the biometric reference template(s) identifier is/are included, the identified biometric reference template(s) is/are retrieved from the reference template database or repository.

At 426, the tokenized biometric sample is detokenized. This may include transferring the data to a TSP with a detokenization request. The TSP detokenizes the biometric data and transmits the plaintext biometric data to the BSP. In arrangements where the biometric reference template is included the identification event journal entry, the stored biometric reference template(s) is/are also detokenized.

If a positive identification event occurred at 406 in method 400, then at 428 it is determined whether the biometric sample matches the biometric reference template stored in the identification journal entry. This process can include using the biometric sample to generate (using the same processing techniques) a temporary biometric reference template to match to the biometric reference template. If the biometric sample matches the biometric reference template, identification is achieved and a fresh positive audit match value is generated at 430. If the biometric reference sample does not match with the biometric reference template, the audit of the identification is not achieved and a fresh negative audit match value is generated at 432.

If a negative identification event occurred at 408 in method 400, then at 428 it is determined whether the biometric sample does not match with the plurality of biometric reference templates stored in the identification journal entry (e.g., templates used during the original failed identification event). This process can include using the biometric sample to generate (using the same processing techniques) a temporary biometric reference template to match with the biometric reference template. If the biometric sample does not match with the plurality of biometric reference templates, identification is not achieved and a fresh negative match value is generated at 432. If the biometric reference sample does match with the biometric reference template, the identification is achieved and a fresh positive match value is generated at 430.

At 434, it is determined whether the fresh match value generated at 430 or 432 is similar to the match value of the original identification event determined at 406 or 408 in the identification method 400. If the fresh match value is similar to the match value stored in the identification event journal entry (e.g., both attempts failed or both attempts succeeded), the audit of the identification process succeeds and a positive audit identification value is generated at 436. If the fresh match value is not similar to the match value stored in the identification event journal entry (e.g., one attempt failed or and the other attempt succeeded), the audit of the identification process fails and a negative audit identification value is generated at 438.

The result of the audit at 436 or 438 can trigger the generation of a compliance event journal entry that is stored in the event journal or similar repository. The compliance event journal entry includes an identifier signifying the biometric identification event journal entry, and the identification audit match value. In some arrangements, the compliance event journal entry may be digitally signed by the entity conducting the audit event. In some arrangements, the digital signing is performed using SignedData cryptographic message syntax to generate a SignedData message and binds additional identifiers (e.g., OIDs) and other information related to the compliance event journal entry.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method of auditing a biometric enrollment event journal entry, the method comprising:
   retrieving, by an authentication computing system, a biometric enrollment event journal entry, the biometric enrollment event journal entry comprising:
      at least one tokenized biometric reference sample, the at least one tokenized biometric reference sample generated by tokenizing with a first tokenization schema an at least one biometric reference sample captured from a user having a unique user identifier, wherein the at least one biometric reference sample is processed to generate biometric data, the biometric data tokenized with a second tokenization schema to generate tokenized biometric data,
      a biometric reference template identifier, the biometric reference template identifier uniquely identifying a biometric reference template, the biometric reference template being generated using the at least one biometric reference sample, and
      an enrollment match value indicative of whether the at least one biometric reference sample matched with the biometric reference template;
   retrieving, by the computing system, the at least one tokenized biometric reference sample in the biometric enrollment event journal entry;
   retrieving, by the computing system, the biometric reference template associated with the biometric reference template identifier in the biometric enrollment event journal entry;
   detokenizing, by the computing system, the at least one tokenized biometric reference sample to retrieve the at least one biometric reference sample;
   determining, by the computing system, whether the at least one biometric reference sample matches with the biometric reference template;
   generating, by the computing system, a temporary enrollment match value indicative of whether the at least one biometric reference sample matched with the biometric reference template of the user;
   determining, by the computing system, whether the temporary enrollment match value matches with the enrollment match value;

generating, by the computing system, an audit enrollment match value indicative of whether the temporary enrollment match value matches with the enrollment match value; and generating, by the computing system, a first compliance event journal entry, the first compliance event journal entry comprising:
- a first identifier signifying the biometric enrollment event journal entry, and
- the audit enrollment match value, wherein the first compliance event journal entry provides an audit of the biometric enrollment event journal entry and an indication of the validity of the biometric enrollment event journal entry;

digitally signing, by the computing system, the first compliance event journal entry using SignedData cryptographic message syntax to generate a SignedData message;

binding, by the computing system, the first identifier to the SignedData message via an attribute of the SignedData message; and binding, by the computing system, a second identifier to the SignedData message via an attribute of the SignedData message, the second identifier identifying the first tokenization schema.

2. The method of claim 1, further comprising:
digitally signing, by the computing system, the first compliance event journal entry with a private key,
wherein authenticity and data integrity of the first compliance event journal entry can be determined based on each of the digitally signed first compliance event journal entry and a public key of a public/private key pair including the private key.

3. The method of claim 1,
wherein the attribute includes a first uniform resource identifier query string, the first uniform resource identifier query string including a first uniform resource locator identifying a first tokenization service provider capable of recovering the biometric reference sample from the tokenized biometric reference sample.

4. The method of claim 3, further comprising:
binding, by the computing system, a third identifier to the SignedData message via an attribute of the SignedData message, the third identifier identifying the second tokenization schema, wherein the attribute includes a second uniform resource identifier query string, the second uniform resource identifier query string including a second uniform resource locator identifying a second tokenization service provider capable of recovering the biometric data from the tokenized biometric data.

5. The method of claim 1, wherein the biometric reference template further includes at least one of:
- a device identifier uniquely identifying a device used to capture the biometric reference sample, and
- a location at which the at least one biometric reference sample was captured, wherein auditing the biometric enrollment event further includes validating the at least one of the device identifier and the location.

6. The method of claim 1, further comprising:
digitally signing, by the computing system, the biometric enrollment event journal entry with a private key, wherein authenticity and data integrity of the biometric enrollment event journal entry can be determined based on each of the digitally signed biometric enrollment event journal entry and a public key of a public/private key pair including the private key.

7. A method of auditing a biometric verification event journal entry, the method comprising:
retrieving, by an authentication computing system, a biometric verification event journal entry, the biometric verification event journal entry comprising:
- a biometric reference template identifier, the biometric reference template identifier uniquely identifying a biometric reference template generated using an at least one biometric reference sample captured from a user having a unique user identifier,
- at least one tokenized biometric sample, the at least one tokenized biometric sample generated by tokenizing with a first tokenization schema an at least one biometric sample captured from an unknown user after the generation of the biometric reference template, wherein the at least one biometric sample is processed to generate biometric data, the biometric data tokenized with a second tokenization schema to generate tokenized biometric data, and
- a verification match value indicative of whether the at least one biometric sample matched with the biometric reference template, wherein a positive verification match value confirms the unknown user is the user having the unique user identifier;

retrieving, by the computing system, the at least one tokenized biometric sample in the biometric verification event journal entry;

retrieving, by the computing system, the biometric reference template associated with the biometric reference template identifier in the biometric verification event journal entry;

detokenizing, by the computing system, the at least one tokenized biometric sample to retrieve the at least one biometric reference sample;

determining, by the computing system, whether the at least one biometric reference sample matches with the biometric reference template;

generating, by the computing system, a temporary verification match value indicative of whether the at least one biometric sample matched with the biometric reference template of the user;

determining, by the computing system, whether the temporary verification match value matches with the verification match value;

generating, by the computing system, an audit verification match value indicative of whether the temporary verification match value matches with the verification match value;

generating, by the computing system, a first verification compliance event journal entry, the first verification compliance event journal entry comprising:
- a first identifier signifying the biometric verification event journal entry, and
- the audit verification match value, wherein the first verification compliance event journal entry provides an audit of the biometric verification event journal entry and an indication of the validity of the biometric verification event journal entry;

digitally signing, by the computing system, the first verification compliance event journal entry using SignedData cryptographic message syntax to generate a SignedData message;

binding, by the computing system, the first identifier to the SignedData message via an attribute of the SignedData message; and binding, by the computing system, a second identifier to the SignedData message via an attribute of the Signed-Data message, the second identifier identifying the first tokenization schema.

8. The method of claim 7, further comprising:
digitally signing, by the computing system, the first verification compliance event journal entry with a private key,
wherein authenticity and data integrity of the first verification compliance event journal entry can be determined based on each of the digitally signed first verification compliance event journal entry and a public key of a public/private key pair including the private key.

9. The method of claim 7,
wherein the attribute includes a first uniform resource identifier query string, the first uniform resource identifier query string including a first uniform resource locator identifying a first tokenization service provider capable of recovering the at least one biometric sample from the at least one tokenized biometric sample.

10. The method of claim 9, further comprising binding, by the computing system, a third identifier to the SignedData message via an attribute of the SignedData message, the third identifier identifying the second tokenization schema, wherein the attribute includes a second uniform resource identifier query string, the second uniform resource identifier query string including a second uniform resource locator identifying a second tokenization service provider capable of recovering the biometric data from the tokenized biometric data.

11. The method of claim 7, wherein the at least one tokenized biometric sample further includes at least one of:
a device identifier uniquely identifying a device used to capture the at least one biometric sample, and
a location at which the at least one biometric sample was captured, wherein auditing the biometric verification event further includes validating the at least one of the device identifier and the location.

12. The method of claim 7, further comprising:
digitally signing, by the computing system, the biometric verification event journal entry with a private key, wherein authenticity and data integrity of the biometric verification event journal entry can be determined based on each of the digitally signed biometric verification event journal entry and a public key of a public/private key pair including the private key.

13. A method of auditing a biometric identification event journal entry, the method comprising:
retrieving, by an authentication computing system, a biometric identification event journal entry, the biometric identification event journal entry comprising:
at least one tokenized biometric sample, the at least one tokenized biometric sample generated by tokenizing with a first tokenization schema an at least one biometric sample captured from an unknown user, wherein the at least one biometric sample is processed to generate biometric data, the biometric data tokenized with a second tokenization schema to generate tokenized biometric data, and
an identification match value indicative of whether the at least one biometric sample matched with a biometric reference template within a plurality of biometric reference templates, each of the plurality of biometric reference templates having been generated using at least one biometric reference sample captured from a respective one of a plurality of users having a respective unique user identifier, wherein a positive identification match value includes:
a biometric reference template identifier, the biometric reference template identifier uniquely identifying the biometric reference template generated using an at least one biometric reference sample captured from a user having a unique user identifier, wherein the positive identification match value confirms the unknown user is the user having the unique user identifier;
retrieving, by the computing system, the at least one tokenized biometric sample in the biometric identification event journal entry;
retrieving, by the computing system, the biometric reference template associated with the biometric reference template identifier in the biometric identification event journal entry;
detokenizing, by the computing system, the at least one tokenized biometric sample to retrieve the at least one biometric reference sample;
determining, by the computing system, whether the at least one biometric reference sample matches with the biometric reference template;
generating, by the computing system, a temporary identification match value indicative of whether the at least one biometric sample matched with the biometric reference template;
determining, by the computing system, whether the temporary identification match value matches with the identification match value;
generating, by the computing system, an audit identification match value indicative of whether the temporary identification match value matches with the identification match value;
generating, by the computing system, a first identification compliance event journal entry, the first identification compliance event journal entry comprising:
a first identifier signifying the biometric identification event journal entry, and
the audit identification match value, wherein the first identification compliance event journal entry provides an audit of the biometric identification event journal entry and an indication of the validity of the biometric identification event journal entry;
digitally signing, by the computing system, the first identification compliance event journal entry using SignedData cryptographic message syntax to generate a SignedData message;
binding, by the computing system, the first identifier to the SignedData message via an attribute of the SignedData message; and
binding, by the computing system, a second identifier to the SignedData message via an attribute of the SignedData message, the second identifier identifying the first tokenization schema.

14. The method of claim 13, further comprising:
digitally signing, by the computing system, the first identification compliance event journal entry with a private key,
wherein authenticity and data integrity of the first identification compliance event journal entry can be determined based on each of the digitally signed first identification compliance event journal entry and a public key of a public/private key pair including the private key.

15. The method of claim 13,
wherein the attribute includes a first uniform resource identifier query string, the first uniform resource identifier query string including a first uniform resource locator identifying a first tokenization service provider capable of recovering the at least one biometric sample from the at least one tokenized biometric sample.

16. The method of claim 15, further comprising binding, by the computing system, a third identifier to the SignedData message via an attribute of the SignedData message, the third identifier identifying the second tokenization schema, wherein the attribute includes a second uniform resource identifier query string, the second uniform resource identifier query string including a second uniform resource locator identifying a second tokenization service provider capable of recovering the biometric data from the tokenized biometric data.

17. The method of claim 13, wherein the at least one tokenized biometric sample further includes at least one of:
a device identifier uniquely identifying a device used to capture the at least one biometric sample, and
a location at which the at least one biometric sample was captured, wherein auditing the biometric identification event journal entry further includes validating the at least one of the device identifier and the location.

18. The method of claim 13, further comprising:
digitally signing, by the computing system, the biometric identification event journal entry with a private key, wherein authenticity and data integrity of the biometric identification event journal entry can be determined based on each of the digitally signed biometric identification event journal entry and a public key of a public/private key pair including the private key.

* * * * *